US008790426B2

(12) United States Patent
Garcia Castro et al.

(10) Patent No.: US 8,790,426 B2
(45) Date of Patent: Jul. 29, 2014

(54) QUATERNIZED TERPOLYMER

(75) Inventors: Ivette Garcia Castro, Ludwigshafen (DE); Cornelia Roeger-Goepfert, Schwetzingen (DE); Wolfgang Grabarse, Mannheim (DE); Klaus Muehlbach, Gruenstadt (DE); Ludwig Voelkel, Limburgerhof (DE); Harald Boehnke, Mannheim (DE); Christian Tock, Alzingen (LU)

(73) Assignee: BASF SE, Ludwigshafen (DE)

( * ) Notice: Subject to any disclaimer, the term of this patent is extended or adjusted under 35 U.S.C. 154(b) by 397 days.

(21) Appl. No.: 13/093,247

(22) Filed: Apr. 25, 2011

(65) Prior Publication Data

US 2011/0258917 A1 Oct. 27, 2011

Related U.S. Application Data

(60) Provisional application No. 61/328,206, filed on Apr. 27, 2010.

(51) Int. Cl.
*C10L 1/192* (2006.01)
*C10L 1/234* (2006.01)

(52) U.S. Cl.
USPC .............. 44/393; 44/394; 44/395; 44/396; 44/397

(58) Field of Classification Search
USPC ........... 44/404, 347, 393, 394, 395, 396, 397, 44/410, 434
See application file for complete search history.

(56) References Cited

U.S. PATENT DOCUMENTS

| | | | |
|---|---|---|---|
| 3,308,081 A | 3/1967 | Glabisch | |
| 4,491,455 A | 1/1985 | Ishizaki et al. | |
| 4,831,095 A | 5/1989 | Ohmae et al. | |
| 4,877,416 A | 10/1989 | Campbell | |
| 4,919,757 A | 4/1990 | Ohmae et al. | |
| 4,980,238 A | 12/1990 | Ohmae et al. | |
| 4,997,895 A * | 3/1991 | Ohmae et al. | 524/555 |
| 6,743,266 B2 | 6/2004 | DeRosa et al. | |
| 2003/0159336 A1 | 8/2003 | Botros | |
| 2008/0307698 A1 | 12/2008 | Barton et al. | |
| 2009/0301552 A1 | 12/2009 | Koenemann et al. | |
| 2010/0006049 A1 | 1/2010 | Jung et al. | |
| 2010/0057779 A1 | 3/2010 | Pan | |

FOREIGN PATENT DOCUMENTS

| | | |
|---|---|---|
| DE | 12 05 699 | 11/1965 |
| DE | 31 41 507 A1 | 4/1983 |
| DE | 38 26 608 A1 | 2/1990 |
| DE | 38 38 918 A1 | 5/1990 |
| DE | 41 42 241 A1 | 6/1993 |
| DE | 43 09 074 A1 | 9/1994 |
| DE | 196 20 262 A1 | 11/1997 |
| DE | 101 02 913 A1 | 7/2002 |
| DE | 10 2005 077 158 A1 | 8/2006 |
| EP | 0 007 590 A1 | 2/1980 |
| EP | 0 061 895 A2 | 10/1982 |
| EP | 0 244 616 A2 | 11/1987 |
| EP | 0 261 957 A2 | 3/1988 |
| EP | 0 276 111 A2 | 7/1988 |
| EP | 0 307 815 A1 | 3/1989 |
| EP | 0 310 875 A1 | 4/1989 |
| EP | 0 315 718 A2 | 5/1989 |
| EP | 0 356 725 A1 | 3/1990 |
| EP | 0 452 328 | 10/1991 |
| EP | 0 476 485 A1 | 3/1992 |
| EP | 0 548 617 A2 | 6/1993 |
| EP | 0 639 632 A1 | 2/1995 |
| EP | 0 700 985 A1 | 3/1996 |
| EP | 0 831 141 A1 | 3/1998 |
| EP | 1 887 074 A1 | 2/2008 |
| WO | WO 87/01126 | 2/1987 |
| WO | WO 93/18115 | 9/1993 |
| WO | WO 94/24231 | 10/1994 |
| WO | WO 96/03367 | 2/1996 |
| WO | WO 96/03479 | 2/1996 |
| WO | WO 97/03946 | 2/1997 |
| WO | WO 98/04656 | 2/1998 |
| WO | WO 99/29748 | 6/1999 |
| WO | WO 00/44857 | 8/2000 |
| WO | WO 00/47698 | 8/2000 |
| WO | WO 02/092645 A1 | 11/2002 |
| WO | WO 2004/035715 A1 | 4/2004 |
| WO | WO 2005/054314 A2 | 6/2005 |
| WO | WO 2006/100083 A1 | 9/2006 |
| WO | WO 2006/135881 A2 | 12/2006 |
| WO | WO 2009/147237 A1 | 12/2009 |

(Continued)

OTHER PUBLICATIONS

U.S. Appl. No. 13/176,317, filed Jul. 5, 2011, Maehling, et al.
U.S. Appl. No. 13/177,042, filed Jul. 6, 2011, Grabarse, et al.
U.S. Appl. No. 13/315,468, filed Dec. 9, 2011, Boehnke.
U.S. Appl. No. 13/307,392, filed Nov. 30, 2011, Voelkel, et al.
U.S. Appl. No. 13/313,400, filed Dec. 7, 2011, Lange, et al.

(Continued)

*Primary Examiner* — Ellen McAvoy
*Assistant Examiner* — Latosha Hines
(74) *Attorney, Agent, or Firm* — Oblon, Spivak, McClelland, Maier & Neustadt, L.L.P.

(57) ABSTRACT

Quaternized terpolymer formed from (A) ethylene, (B) $C_2$-$C_{14}$-alkenyl esters of one or more aliphatic $C_1$-$C_{20}$-monocarboxylic acids or $C_1$-$C_{24}$-alkyl esters of acrylic acid or of methacrylic acid and (Cq) ethylenically unsaturated monomers which comprise at least one tertiary nitrogen atom which is partly or fully in quaternized form. The quaternized terpolymer is suitable as a fuel additive for reducing or preventing deposits, for reducing fuel consumption and for minimizing power loss in direct-injection diesel engines, especially in diesel engines with common-rail injection systems.

18 Claims, No Drawings

(56) References Cited

FOREIGN PATENT DOCUMENTS

| WO | WO 2010/026218 A1 | 3/2010 |
| WO | WO 2010/069810 A1 | 6/2010 |
| WO | WO 2011/012462 A2 | 2/2011 |

OTHER PUBLICATIONS

International Search Report issued Jun. 7, 2011, in PCT/EP2011/056513 (with English Translation of Category of Cited Documents).

U.S. Appl. No. 13/432,554, filed Mar. 28, 2012, Garcia Castro, et al.
U.S. Appl. No. 13/535,847, filed Jun. 28, 2012, Roeger-Goepfert, et al.
U.S. Appl. No. 13/101,426, filed May 5, 2011, Maehling, et al.
U.S. Appl. No. 13/866,291, filed Apr. 19, 2013, Boehnke.
U.S. Appl. No. 13/668,985, filed Nov. 5, 2012, Hansch, et al.
U.S. Appl. No. 13/761,644, filed Feb. 7, 2013, Peretolchin, et al.
U.S. Appl. No. 13/783,708, filed Mar. 4, 2013, Strittmatter, et al.

\* cited by examiner

QUATERNIZED TERPOLYMER

The present invention relates to a quaternized terpolymer formed from (A) 70 to 98.9 mol % of ethylene,
(B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and
(Cq) 0.1 to 15 mol % of at least one ethylenically unsaturated monomer which comprises at least one tertiary nitrogen atom which is partly or fully in quaternized form, where all monomer components together add up to 100 mol %.

The present invention further relates to a process for preparing such a quaternized terpolymer.

The present invention also relates to fuels having a content of such a quaternized terpolymer.

The present invention further relates to the use of this quaternized terpolymer as a fuel additive for reducing or preventing deposits in the injection systems of direct-injection diesel engines, especially in common-rail injection systems, for reducing fuel consumption in direct-injection diesel engines, especially in diesel engines with common-rail injection systems, and for minimizing power loss in direct-injection diesel engines, especially in diesel engines with common-rail injection systems.

In direct-injection diesel engines, the fuel is injected and distributed ultrafinely (nebulized) by a multihole injection nozzle which reaches directly into the combustion chamber in the engine, instead of being introduced into a prechamber or swirl chamber as in the case of the conventional (chamber) diesel engine. The advantage of the direct-injection diesel engines lies in their high performance for diesel engines and a nevertheless low fuel consumption. Moreover, these engines achieve a very high torque even at low speeds.

At present, essentially three methods are being used to inject the fuel directly into the combustion chamber of the diesel engine: the conventional distributor injection pump, the pump-nozzle system (unit-injector system or unit-pump system) and the common-rail system.

In the common-rail system, the diesel fuel is conveyed by a pump with pressures up to 2000 bar into a high-pressure line, the common rail. Proceeding from the common rail, branch lines run to the different injectors which inject the fuel directly into the combustion chamber. The full pressure is always applied to the common rail, which enables multiple injection or a specific injection form. In the other injection systems, in contrast, only one injection is possible. The injection in the common rail is divided essentially into three groups: (1.) pre-injection, by which essentially softer combustion is achieved, such that hard combustion noises ("nailing") are reduced and the engine appears to run quietly; (2.) main injection, which is responsible especially for a good torque profile; and (3.) post-injection, which especially ensures a low $NO_x$ value. In this post-injection, the fuel is generally not combusted, but instead evaporated by residual heat in the cylinder. The exhaust gas/fuel mixture formed is transported to the exhaust gas system, where the fuel, in the presence of suitable catalysts, acts as a reducing agent for the nitrogen oxides $NO_x$.

The variable, cylinder-individual injection in the common-rail injection system can positively influence the pollutant emission of the engine, for example the emission of nitrogen oxides ($NO_x$), carbon monoxide (CO) and especially of particulates (soot). This makes it possible, for example, that engines equipped with common-rail injection systems can meet the Euro 4 standard theoretically even without additional particulate filters.

In modern direct-injection diesel engines, under particular conditions, for example when biodiesel-containing fuels or fuels with metal impurities such as zinc compounds are used, deposits can form on the injector orifices, which adversely affect the injection performance of the fuel and hence impair the performance of the engine, i.e. especially reduce the power, but in some cases also worsen the combustion. The formation of deposits is enhanced further by further developments of the injector construction, especially by the change in the geometry of the nozzles (narrower, conical orifices with rounded outlet). For lasting optimal functioning of engine and injectors, such deposits in the nozzle orifices must be prevented or reduced by suitable fuel additives.

It was therefore an object of the present invention to provide fuel additives which remedy the shortcomings outlined above, i.e. more particularly prevent or reduce deposits in the injection systems, in particular in the injectors, of direct-injection diesel engines, reduce fuel consumption in direct-injection diesel engines and minimize power losses in such engines.

The prior art discloses $C_8$- to $C_{200}$-alkyl- or -alkenylsuccinimides as detergent additives for fuels such as middle distillate fuels and gasoline fuels. For instance, WO 02/092645 (1) describes polyalkenylsuccinimides such as polyisobutenylsuccinimides as additives to fuels such as diesel fuel, heating oil or gasoline fuel, or to lubricants, which—obviously as a result of the preparation—may comprise up to 30% by weight of the corresponding polyalkenylsuccinamides or -succinic monoamides. These polyalkenylsuccinimides are said to counteract engine deposits and deposits on the injection nozzles.

WO 2006/100083 (2) discloses that particular detergent additives reduce the amount of particulates in the exhaust gas emissions of direct-injection diesel engines such as diesel engines with common-rail injection systems. Detergent additives include additives comprising moieties which are derived from succinic anhydride and have hydroxyl and/or amino and/or amido and/or imido groups, such as the corresponding derivatives of polyisobutenylsuccinic anhydride, especially derivatives with aliphatic polyamines. The moieties with hydroxyl and/or amino and/or amido and/or imido groups are, for example, carboxylic acid groups, acid amides of monoamines, acid amides of di- or polyamines, which still have free amino groups as well as the amide function, succinic acid derivatives with one acid and one amide function, carboximides with monoamines, carboximides with di- or polyamines, which still have free amine groups as well as the imide function, or diimides which are formed by reaction of di- or polyamines with two succinic acid derivatives.

EP 1 887 074 A1 (3) describes a process for removing or reducing injector deposits in diesel engines using reaction products between a hydrocarbyl-substituted succinic acid or anhydride thereof, for example polyisobutenylsuccinic anhydride, and hydrazine. Among these reaction products, monohydrazide structures are also mentioned.

European application 09166729.5 (4), which was yet to be published at the priority date of the present application, describes low molecular weight or polymeric organic compounds which have at least one equivalent of a basic nitrogen function and at least one equivalent of a free carboxyl group, which together are capable of forming a betaine structure, as fuel additives for preventing or reducing deposits in injectors of direct-injection diesel engines, and for minimizing power loss in such engines. Such a betaine structure may be present, for example, in a monoamide formed from a succinic anhydride and N-(1-aminopropylimidazole).

WO 2006/135881 (5) describes the condensation of hydrocarbyl-substituted acylating agents, which are obtainable by ene reaction of olefins with maleic anhydride, with amines having an additional tertiary amino group and subsequent quaternization of the tertiary amino group to give quaternary ammonium salts, which are suitable as fuel additives for cleaning and keeping clean intake systems of internal combustion engines.

The above-described $C_8$-$C_{200}$-alkyl- or -alkenylsuccinimides which are known from the prior art and frequently used in practice, such as polyisobutenylsuccinimides and related systems, are capable of achieving the specific object outlined only to an insufficient degree; however, the additional use thereof in the present invention as further fuel additives in a minor amount is not harmful.

This object is achieved by the use of the quaternized terpolymer formed from components (A), (B) and (Cq) cited at the outset.

The inventive quaternized terpolymer is preferably formed from a terpolymer formed from
(A) 70 to 98.9 mol % of ethylene,
(B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and
(C) 0.1 to 15 mol % of at least one ethylenically unsaturated monomer which comprises at least one quaternizable tertiary nitrogen atom which,
where all monomer components together add up to 100 mol %,
by partial or full quaternization, which follows the polymerization of components (A), (B) and (C), of the at least one tertiary nitrogen atom in component (C) with at least one quaternizing agent.

The inventive terpolymer is preferably formed from
(A) 76 to 96 mol % of ethylene,
(B) 3 to 12 mol % of component (B) and
(C) 1 to 12 mol % of component (Cq).

The present application also provides a process for preparing a quaternized terpolymer, which comprises obtaining a terpolymer from the components
(A) 70 to 98.9 mol % of ethylene,
(B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and
(C) 0.1 to 15 mol % of at least one ethylenically unsaturated monomer which comprises at least one tertiary quaternizable nitrogen atom which,
where all monomer components together add up to 100 mol %,
by polymerization, and then partly or fully quaternizing the at least one tertiary nitrogen atom in component (C) with at least one quaternizing agent.

Suitable $C_2$-$C_{14}$-alkenyl esters of one or more aliphatic $C_1$-$C_{21}$-monocarboxylic acids for embodiment (i) of component (B) are especially the vinyl and propenyl esters of aliphatic monocarboxylic acids having 2 to 18 carbon atoms, the hydrocarbon radical of which may be linear or branched. Among these, preference is given to the vinyl esters. Irrespective of the alkenyl radical, particularly preferred monocarboxylic acids for this purpose are those having 2 to 16 and especially 2 to 10 carbon atoms. Among the carboxylic acids with a branched hydrocarbon radical, preference is given to those whose branch is in the α-position to the carboxyl group, and the α carbon atom is more preferably tertiary, i.e. the carboxylic acid is one known as a neocarboxylic acid. However, the hydrocarbon radical of the carboxylic acid is preferably linear. Examples of suitable alkenyl carboxylates (i) are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, though preference is given to the vinyl esters.

Suitable $C_1$-$C_{24}$-alkyl esters of acrylic acid or of methacrylic acid for embodiment (ii) of component (B) are especially the esters of acrylic acid and of methacrylic acid with $C_1$-$C_{12}$-alkanols, especially $C_1$-$C_4$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol.

The inventive quaternized terpolymer may also comprise, in copolymerized form, two or more monomer species (i) and/or (ii) of component (B), i.e. two or more different alkenyl carboxylates (i) or two or more different acrylic or methacrylic esters (ii), or at least one alkenyl carboxylate (i) and at least one acrylic or methacrylic ester (ii), which differ in the alkenyl function and/or in the carboxylic acid group and/or in the alcohol radical.

A particularly preferred component (B) is vinyl acetate.

Suitable ethylenically unsaturated monomers (C) which comprise at least one quaternizable nitrogen atom are especially carboxyl derivatives, for example carboxylic esters, carboxamides or carboximides, of ethylenically unsaturated mono- or dicarboxylic acids, for example of acrylic acid or methacrylic acid or of maleic acid, which have at least one quaternizable tertiary nitrogen atom in the side chain at the side of the carboxyl derivative function facing away from the carbonyl. For instance, compounds with good suitability as monomers (C) are often subject to the general formula (I)

$$H_2C=C(R^1)-CO-X-(CH_2)_n-NR^2R^3 \qquad (I)$$

in which the variable $R^1$ is hydrogen (for an acrylic acid derivative) or methyl (for a methacrylic acid derivative), the variable X is O, NH or $NR^4$, and the variables $R^2$, $R^3$ and $R^4$ each independently denote $C_1$-$C_{20}$-alkyl groups, and the variable n is from 1 to 12, especially from 2 to 6, in particular 2 or 3.

Typical examples of compounds of the general formula (I) are 2-(N,N-dimethyl-amino)ethyl acrylate, 2-(N,N-dimethylamino)ethyl methacrylate, N-[2-(N',N'-dimethylamino)ethyl]acrylamide, N[2-(N',N'-dimethylamino)ethyl]methacrylamide, 3-(N,N-dimethylamino)propyl acrylate, 3-(N,N-dimethylamino)propyl methacrylate, N-[3-(N',N'-dimethylamino)propyl]acrylamide, N-[3-(N',N'-dimethylamino)propyl]methacrylamide, 2-(N,N-diethylamino)ethyl methacrylate, N-[2-(N,N-diethylamino)ethyl]acrylamide, N-[2-(N,N-diethylamino)ethyl]methacrylamide, 3-(N,N-diethylamino)propyl acrylate, 3-(N,N-diethylamino)propyl methacrylate, N[3-(N,N-diethylamino)propyl]acrylamide and N-[3-(N,N-diethylamino)propyl]methacrylamide.

Further suitable monomers (C) are saturated, partly unsaturated or unsaturated five-membered or six-membered heterocyclic rings which bear an alkenyl substituent, especially a vinyl group, an acrylate group or a methacrylate group, and have at least one quaternizable tertiary nitrogen atom in the ring. The acrylate or methacrylate group is appropriately obtained by ester formation with acrylic acid or methacrylic acid via a hydroxyalkylene side chain, especially an ω-hydroxy-$C_1$-$C_4$-alkylene side chain, on the heterocycle. In the case that the side chain responsible for the linkage to the acrylic acid or methacrylic acid via a hydroxyl function is on a carbon atom in the heterocycle, a hydroxyl group directly on the heterocycle, i.e. attached without an alkylene bridge, is also sufficient for linkage with the acrylic acid or methacrylic acid. Examples of such saturated, partly unsaturated or unsaturated five-membered or six-membered heterocyclic rings bearing an alkenyl substituent are N-vinylimidazole, N-vinylbenzimi-dazole, N-vinylpyrazole, N-vinyl-3-imidazoline, N—($C_1$-$C_{20}$-alkyl)-N'-vinylpiperazines such as N-methyl-N'-vinylpiperazine, 2-, 3- or 4-vinylpyridine, and the esters of acrylic acid or of methacrylic acid with N-(β-hydroxyethyl) imidazole, N-(β-hydroxyethyl)-benzimidazole, N-(β-hydroxyethyl)pyrazole, N-(β-hydroxyethyl)-3-imidazoline, N—($C_1$-$C_{20}$-alkyl)-N'-(β-hydroxyethyl)piperazines such as N-methyl-N'-(β-hydroxyethyl)-piperazine, 2-, 3- or 4-(β-hydroxyethyl)pyridine and 2-, 3- or 4-hydroxypyridine.

Useful $C_1$-$C_{20}$-alkyl groups which may occur as substituents in the monomers (C) are, for example, methyl, ethyl, n-propyl, isopropyl, n-butyl, isobutyl, sec-butyl, tert-butyl, n-pentyl, sec-pentyl, tert-pentyl, n-hexyl, n-heptyl, n-octyl, 2-ethylhexyl, n-nonyl, iso-nonyl, 2-propylheptyl, n-decyl, n-dodecyl, n-tridecyl, isotridecyl, n-tetradecyl, n-hexydecyl, n-octadecyl and eicosyl. Among these, preference is given to methyl, ethyl, n-propyl, isopropyl, n-butyl, isobutyl, sec-butyl and tert-butyl; particular preference is given to methyl.

In a preferred embodiment, the inventive quaternized terpolymer comprises, as component (Cq), at least one partly or fully quaternized ethylenically unsaturated monomer from the group of 2-(N,N-dialkylamino)ethyl acrylates, 2-(N,N-dialkylamino)ethyl methacrylates, N-[3-(N',N'-dialkylamino)propyl]acrylamides, N-[3-(N',N'-dialkylamino)propyl]methacrylamides, N-alkyl-N'-vinylpiperazines, N-vinylimidazole, vinylpyridines and the esters of acrylic acid or of methacrylic acid with N-(β-hydroxyethyl)imidazole, N-alkyl-N'-(β-hydroxyethyl)piperazines, (β-hydroxyethyl)-pyridines and hydroxypyridines. In this context, preferred alkyl substituents are methyl, ethyl, n-propyl, isopropyl, n-butyl, isobutyl, sec-butyl and tert-butyl, especially methyl.

Useful quaternizing agents are in principle all compounds suitable as such. However, preference is given to quaternizing the at least one quaternizable tertiary nitrogen atom in the monomers (C) with at least one quaternizing agent selected from epoxides, dialkyl sulfates, dialkyl sulfites, alkyl halides, arylalkyl halides, alkyl carboxylates and dialkyl carbonates.

Suitable epoxides are, for example, $C_2$-$C_{12}$-alkylene oxides such as ethylene oxide, propylene oxide, 1,2-butylene oxide, 2,3-butylene oxide, 2-methyl-1,2-propene oxide (isobutene oxide), 1,2-pentene oxide, 2,3-pentene oxide, 2-methyl-1,2-butene oxide, 3-methyl-1,2-butene oxide, 1,2-hexene oxide, 2,3-hexene oxide, 3,4-hexene oxide, 2-methyl-1,2-pentene oxide, 2-ethyl-1,2-butene oxide, 3-methyl-1,2-pentene oxide, 1,2-decene oxide, 1,2-dodecene oxide or 4-methyl-1,2-pentene oxide, and aromatic-substituted ethylene oxides such as styrene oxide or 4-methylstyrene oxide.

In the case of use of epoxides as quaternizing agents, they are preferably used in combination with protic acids, especially with $C_1$-$C_{12}$-monocarboxylic acids such as formic acid, acetic acid or propionic acid, or $C_2$-$C_{12}$-dicarboxylic acids such as oxalic acid or adipic acid; also suitable, however, are sulfonic acids such as benzenesulfonic acid or toluenesulfonic acid, or aqueous mineral acids such as sulfuric acid or hydrochloric acid.

Suitable dialkyl sulfates are preferably di($C_1$-$C_{20}$-alkyl) sulfates, especially di($C_1$-$C_4$-alkyl) sulfates such as dimethyl sulfate or diethyl sulfate. On completion of quaternization, the by-products formed, such as monoalkyl sulfates and sulfates, can be removed by treatment with anion exchangers.

Suitable dialkyl sulfites are preferably di($C_1$-$C_{20}$-alkyl) sulfites, especially di($C_1$-$C_4$-alkyl) sulfites such as dimethyl sulfite or diethyl sulfite. On completion of quaternization, the by-products formed, such as monoalkyl sulfates and sulfites, can be removed by treatment with anion exchangers.

Suitable alkyl halides are preferably $C_1$-$C_{20}$-alkyl fluorides, chlorides, bromides or iodides, especially $C_1$-$C_4$-alkyl fluorides, chlorides, bromides or iodides, such as methyl chloride, methyl bromide, methyl iodide, ethyl chloride, ethyl bromide or ethyl iodide. On completion of quaternization, the by-products formed, such as halide anions, can be removed by treatment with anion exchangers.

Suitable benzyl halides are, for example, benzyl chloride, benzyl bromide or benzyl iodide; the benzene ring of the benzyl radical may in principle also bear one or more substituents such as $C_1$-$C_4$-alkyl groups. On completion of quaternization, the by-products halide anions formed can be removed by treatment with anion exchangers.

Suitable alkyl carboxylates are preferably mono- or di($C_1$-$C_{20}$-alkyl) mono- or dicarboxylates, especially mono- or di($C_1$-$C_4$-alkyl) mono- or dicarboxylates, where the parent mono- or dicarboxylic acid has 1 to 12 or 2 to 12 carbon atoms respectively, for example methyl formate or dimethyl oxalate. Similarly to the case of the epoxides, when using alkyl carboxylates as quaternizing agents, it is often advisable to use them preferably in combination with protic acids, especially with $C_1$-$C_{12}$-monocarboxylic acids such as formic acid, acetic acid or propionic acid, or $C_2$-$C_{12}$-dicarboxylic acids such as oxalic acid or adipic acid, or else sulfonic acids such as benzenesulfonic acid or toluenesulfonic acid, or aqueous mineral acids such as sulfuric acid or hydrochloric acid.

Suitable alkyl carbonates are preferably di($C_1$-$C_{20}$-alkyl) carbonates, especially di($C_1$-$C_4$-alkyl) carbonates such as dimethyl carbonate or diethyl carbonate.

The terpolymer formed from monomers (A), (B) and (C), which serves as the precursor for the inventive quaternized terpolymer formed from components (A), (B) and (Cq), can be prepared by known and customary polymerization techniques. The mixture of the three monomer components (A), (B) and (C) can be polymerized in solution, in suspension or preferably in bulk. In general, a high-pressure polymerization process is used for this purpose, as described, for example, in EP-A 007 590, in DE-A 31 41 507 and in the documents cited therein, and works at pressures of 50 to 5000 bar, especially 1000 to 2500 bar, in particular 500 to 2000 bar, typically 1600 to 1800 bar, and at temperatures of 50 to 450° C., especially 100 to 350° C., in particular 150 to 250° C., typically 210 to 230° C. A suitable polymerization apparatus for this purpose is especially a continuous tubular reactor. Preference is given to initiating the polymerization by means of initiators which decompose by a free-radical mechanism; air or oxygen is suitable for this purpose, optionally in the presence of additionally metered organic peroxides and/or hydroperoxides. Examples of useful organic peroxides or hydroperoxides include diisopropylbenzene hydroperoxide, cumene hydroperoxide, methyl isobutyl ketone peroxide, di-tert-butyl peroxide and tert-butyl periisononate. In addition, it is possible also to use suitable regulators such as aliphatic aldehydes in the polymerization.

The quaternization which follows the polymerization of the monomers (A), (B) and (C) is likewise performed by known techniques customary therefor. The conditions here are typically temperatures in the range from 15 to 150° C., especially from 20 to 110° C., and standard pressure. The quaternization reaction can be performed in an inert organic solvent such as toluene or xylene. In general, 0.1 to 1.5 equivalents, especially 0.5 to 1.25 equivalents, of quaternizing agent are used per equivalent of quaternizable tertiary nitrogen atom, where the quaternizing agent may be a single chemical compound or a mixture of different chemical compounds suitable for quaternization. In the case of additional use of protic acids, they are typically used in equimolar amounts or in an up to 2.5-fold excess to the quaternizing agent; in this case, it is possible to use a single protic acid or a mixture of different protic acids.

The inventive quaternized terpolymer preferably has a number-average molecular weight ($M_n$) in the range from 1000 to 20 000, especially from 1250 to 15 000, in particular from 1500 to 10 000 (determined in each case by gel permeation chromatography).

The inventive quaternized terpolymer is outstandingly suitable as a fuel additive and can in principle be used in any fuels. It brings about a whole series of advantageous effects in the operation of internal combustion engines with fuels. The inventive quaternized terpolymer is preferably used in gasoline fuels, but especially in middle distillate fuels.

The present invention therefore also provides fuels, especially middle distillate fuels, with a content of the inventive quaternized terpolymer effective as an additive for achieving advantageous effects in the operation of internal combustion engines, for example of diesel engines, especially of direct-injection diesel engines, in particular of diesel engines with common-rail injection systems. This effective content (dosage) is generally 10 to 5000 ppm by weight, preferably 20 to 1500 ppm by weight, especially 25 to 1000 ppm by weight, in particular 30 to 750 ppm by weight, based in each case on the total amount of fuel.

The fuel additized with the inventive quaternized terpolymer is usually a gasoline fuel or especially a middle distillate fuel, in particular a diesel fuel. The fuel may comprise further customary additives to improve efficacy and suppress wear. These include primarily customary detergent additives, carrier oils, lubricity additives, cetane number improvers, conductivity improvers, anticorrosion additives, antifoams and dehazers.

The customary detergent additives are preferably amphiphilic substances which possess at least one hydrophobic hydrocarbon radical with a number-average molecular weight ($M_n$) of 85 to 20 000 and at least one polar moiety selected from:

(Da) mono- or polyamino groups having up to 6 nitrogen atoms, at least one nitrogen atom having basic properties;
(Db) nitro groups, optionally in combination with hydroxyl groups;
(Dc) hydroxyl groups in combination with mono- or polyamino groups, at least one nitrogen atom having basic properties;
(Dd) carboxyl groups or their alkali metal or alkaline earth metal salts;
(De) sulfonic acid groups or their alkali metal or alkaline earth metal salts;
(Df) polyoxy-$C_2$- to $C_4$-alkylene moieties terminated by hydroxyl groups, mono- or polyamino groups, at least one nitrogen atom having basic properties, or by carbamate groups;
(Dg) carboxylic ester groups;
(Dh) moieties derived from succinic anhydride and having hydroxyl and/or amino and/or amido and/or imido groups; and/or
(Di) moieties obtained by Mannich reaction of substituted phenols with aldehydes and mono- or polyamines.

The hydrophobic hydrocarbon radical in the above detergent additives, which ensures the adequate solubility in the fuel, has a number-average molecular weight ($M_n$) of 85 to 20 000, preferably of 113 to 10 000, more preferably of 300 to 5000, even more preferably of 300 to 3000, even more especially preferably of 500 to 2500 and especially of 700 to 2500, in particular of 800 to 1500. As typical hydrophobic hydrocarbon radicals, especially in conjunction with the polar especially polypropenyl, polybutenyl and polyisobutenyl radicals with a number-average molecular weight $M_n$ of preferably in each case 300 to 5000, more preferably 300 to 3000, even more preferably 500 to 2500, even more especially preferably 700 to 2500 and especially 800 to 1500 into consideration.

Examples of the above groups of detergent additives include the following:

Additives comprising mono- or polyamino groups (Da) are preferably polyalkenemono- or polyalkenepolyamines based on polypropene or on high-reactivity (i.e. having predominantly terminal double bonds) or conventional (i.e. having predominantly internal double bonds) polybutene or polyisobutene having $M_n$=300 to 5000, more preferably 500 to 2500 and especially 700 to 2500. Such additives based on high-reactivity polyisobutene, which can be prepared from the polyisobutene which may comprise up to 20% by weight of n-butene units by hydroformylation and reductive amination with ammonia, monoamines or polyamines such as dimethylaminopropylamine, ethylenediamine, diethylenetriamine, triethylenetetramine or tetraethylenepentamine, are known especially from EP-A 244 616. When polybutene or polyisobutene having predominantly internal double bonds (usually in the β and γ positions) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or the abovementioned polyamines. Corresponding additives based on polypropene are described in particular in WO-A 94/24231.

Further preferred additives comprising monoamino groups (Da) are the hydrogenation products of the reaction products of polyisobutenes having an average degree of polymerization P=5 to 100 with nitrogen oxides or mixtures of nitrogen oxides and oxygen, as described in particular in WO-A 97/03946.

Further preferred additives comprising monoamino groups (Da) are the compounds obtainable from polyisobutene epoxides by reaction with amines and subsequent dehydration and reduction of the amino alcohols, as described in particular in DE-A 196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described in particular in WO-A 96/03367 and in WO-A 96/03479. These reaction products are generally mixtures of pure nitropolyisobutenes (e.g. α, β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are in particular reaction products of polyisobutene epoxides obtainable from polyisobutene having preferably predominantly terminal double bonds and $M_n$=300 to 5000, with ammonia or mono- or polyamines, as described in particular in EP-A 476 485.

Additives comprising carboxyl groups or their alkali metal or alkaline earth metal salts (Dd) are preferably copolymers of $C_2$- to $C_{40}$-olefins with maleic anhydride which have a total molar mass of 500 to 20 000 and some or all of whose carboxyl groups have been converted to the alkali metal or alkaline earth metal salts and any remainder of the carboxyl groups has been reacted with alcohols or amines. Such additives are disclosed in particular by EP-A 307 815. Such additives serve mainly to prevent valve seat wear and can, as described in WO-A 87/01126, advantageously be used in combination with customary fuel detergents such as poly(iso)buteneamines or polyetheramines.

Additives comprising sulfonic acid groups or their alkali metal or alkaline earth metal salts (De) are preferably alkali metal or alkaline earth metal salts of an alkyl sulfosuccinate, as described in particular in EP-A 639 632. Such additives serve mainly to prevent valve seat wear and can be used advantageously in combination with customary fuel detergents such as poly(iso)buteneamines or polyetheramines.

Additives comprising polyoxy-$C_2$- to $C_4$-alkylene moieties (Df) are preferably polyethers or polyetheramines which are obtainable by reaction of $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A 310 875, EP-A 356 725, EP-A 700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and also the corresponding reaction products with ammonia.

Additives comprising carboxylic ester groups (Dg) are preferably esters of mono-, di- or tricarboxylic acids with long-chain alkanols or polyols, in particular those having a minimum viscosity of 2 $mm^2$/s at 100° C., as described in particular in DE-A 38 38 918. The mono-, di- or tricarboxylic acids used may be aliphatic or aromatic acids, and particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also have carrier oil properties.

Additives comprising moieties derived from succinic anhydride and having hydroxyl and/or amino and/or amido and/or especially imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity polyisobutene having $M_n$=preferably 300 to 5000, more preferably 300 to 3000, even more preferably 500 to 2500, even more especially preferably 700 to 2500 and especially 800 to 1500, with maleic anhydride by a thermal route in an ene reaction or via the chlorinated polyisobutene. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. In the presence of imido moieties D(h), the further detergent additive in the context of the present invention is, however, used only up to a maximum of 100% of the weight of compounds with betaine structure. Such fuel additives are common knowledge and are described, for example, in documents (1) and (2). They are preferably the reaction products of alkyl- or alkenyl-substituted succinic acids or derivatives thereof with amines and more preferably the reaction products of polyisobutenyl-substituted succinic acids or derivatives thereof with amines. Of particular interest in this context are reaction products with aliphatic polyamines (polyalkyleneimines) such as especially ethylenediamine, diethylenetriamine, triethylenetetramine, tetraethylenepentamine, pentaethylenehexamine and hexaethyleneheptamine, which have an imide structure.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may stem from conventional or high-reactivity polyisobutene having $M_n$=300 to 5000. Such "polyisobutene Mannich bases" are described in particular in EP-A 831 141.

In the case of a fuel, especially a middle distillate fuel, in particular a diesel fuel, which comprises, in addition to the inventive quaternized terpolymer, one or more detergent additives from group (Dh), i.e. detergent additives which have moieties derived from succinic anhydride and having hydroxyl and/or amino and/or amido and/or imido groups, the object underlying the present invention is achieved particularly efficiently.

One or more of the detergent additives mentioned can be added to the fuel in such an amount that the dosage of these detergent additives is preferably 25 to 2500 ppm by weight, especially 75 to 1500 ppm by weight, in particular 150 to 1000 ppm by weight.

Carrier oils additionally used may be of mineral or synthetic nature. Suitable mineral carrier oils are the fractions obtained in crude oil processing, such as brightstock or base oils having viscosities, for example, from the SN 500 to 2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range from about 360 to 500° C., obtainable from natural mineral oil which has been catalytically hydrogenated and isomerized under high pressure and also deparaffinized). Likewise suitable are mixtures of the abovementioned mineral carrier oils.

Examples of suitable synthetic carrier oils are polyolefins (polyalphaolefins or polyinternalolefins), (poly)esters, (poly)alkoxylates, polyethers, aliphatic polyetheramines, alkylphenol-started polyethers, alkylphenol-started polyetheramines and carboxylic esters of long-chain alkanols.

Examples of suitable polyolefins are olefin polymers having $M_n$=400 to 1800, in particular based on polybutene or polyisobutene (hydrogenated or unhydrogenated).

Examples of suitable polyethers or polyetheramines are preferably compounds comprising polyoxy-$C_2$- to $C_4$-alkylene moieties which are obtainable by reacting $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described in particular in EP-A 310 875, EP-A 356 725, EP-A 700 985 and U.S. Pat. No. 4,877,416. For example, the polyetheramines used may be poly-$C_2$- to $C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are in particular esters of mono-, di- or tricarboxylic acids with long-chain alkanols or polyols, as described in particular in DE-A 38 38 918. The mono-, di- or tricarboxylic acids used may be aliphatic or aromatic acids; suitable ester alcohols or polyols are in particular long-chain representatives having, for example, 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A 38 26 608, DE-A 41 42 241, DE-A 43 09 074, EP-A 452 328 and EP-A 548 617.

Examples of particularly suitable synthetic carrier oils are alcohol-started polyethers having about 5 to 35, preferably about 5 to 30, more preferably 10 to 30 and especially 15 to 30 $C_3$- to $C_6$-alkylene oxide units, for example propylene oxide, n-butylene oxide and isobutylene oxide units, or mixtures thereof, per alcohol molecule. Nonlimiting examples of suitable starter alcohols are long-chain alkanols or phenols substituted by long-chain alkyl in which the long-chain alkyl radical is in particular a straight-chain or branched $C_6$- to $C_{18}$-alkyl radical. Preferred examples include tridecanol and nonylphenol. Particularly preferred alcohol-started polyethers are the reaction products (polyetherification products) of monohydric aliphatic $C_6$- to $C_{18}$-alcohols with $C_3$- to $C_6$-alkylene oxides. Examples of monohydric aliphatic $C_6$-$C_{18}$-alcohols are hexanol, heptanol, octanol, 2-ethylhexanol, nonyl alcohol, decanol, 3-propylheptanol, undecanol, dodecanol, tridecanol, tetradecanol, pentadecanol, hexadecanol, octadecanol and the constitutional and positional isomers thereof. The alcohols can be used either in the form of the pure isomers or in the form of technical grade mixtures. A particularly preferred alcohol is tridecanol. Examples of $C_3$- to $C_6$-alkylene oxides are propylene oxide, such as 1,2-propylene oxide, butylene oxide, such as 1,2-butylene oxide, 2,3-butylene oxide, isobutylene oxide or tetrahydrofuran, pentylene oxide and hexylene oxide. Particular preference among these is given to $C_3$- to $C_4$-alkylene oxides, i.e. propylene oxide such as 1,2-propylene oxide and butylene oxide such as 1,2-butylene oxide, 2,3-butylene oxide and isobutylene oxide. Especially butylene oxide is used.

Further suitable synthetic carrier oils are alkoxylated alkylphenols, as described in DE-A 10 102 913.

Preferred carrier oils are synthetic carrier oils, particular preference being given to the above-described alcohol-started polyethers.

The carrier oil or the mixture of different carrier oils is added to the fuel in an amount of preferably 1 to 1000 ppm by weight, more preferably of 10 to 500 ppm by weight and especially of 20 to 100 ppm by weight.

It is also possible for the fuel to comprise further customary additives and coadditives in the amounts customary therefor. In the case of middle distillate fuels, especially diesel fuels, these are in particular cold flow improvers, lubricity improvers, corrosion inhibitors, demulsifiers, dehazers, antifoams, cetane number improvers, combustion improvers, antioxidants or stabilizers, antistats, metallocenes, metal deactivators, dyes and/or solvents. In the case of gasoline fuels, these are in particular friction modifiers, corrosion inhibitors, demulsifiers, dehazers, antifoams, combustion improvers, antioxidants or stabilizers, antistats, metallocenes, metal deactivators, dyes and/or solvents.

Suitable cold flow improvers are in principle all organic compounds which are capable of improving the flow performance of middle distillate fuels or diesel fuels under cold conditions. For the intended purpose, they must have sufficient oil solubility. In particular, useful cold flow improvers for this purpose are the cold flow improvers (middle distillate flow improvers, MDFIs) typically used in the case of middle distillates of fossil origin, i.e. in the case of customary mineral diesel fuels. However, it is also possible to use organic compounds which partly or predominantly have the properties of a wax antisettling additive (WASA) when used in customary diesel fuels. They can also act partly or predominantly as nucleators. It is, though, also possible to use mixtures of organic compounds effective as MDFIs and/or effective as WASAs and/or effective as nucleators.

The cold flow improver is typically selected from
(K1) copolymers of a $C_2$- to $C_{40}$-olefin with at least one further ethylenically unsaturated monomer;
(K2) comb polymers;
(K3) polyoxyalkylenes;
(K4) polar nitrogen compounds;
(K5) sulfocarboxylic acids or sulfonic acids or derivatives thereof; and
(K6) poly(meth)acrylic esters.

It is possible to use either mixtures of different representatives from one of the particular classes (K1) to (K6) or mixtures of representatives from different classes (K1) to (K6).

Suitable $C_2$- to $C_{40}$-olefin monomers for the copolymers of class (K1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally α-olefins) or internally. However, preference is given to α-olefins, more preferably α-olefins having 2 to 6 carbon atoms, for example propene, 1-butene, 1-pentene, 1-hexene and in particular ethylene.

In the copolymers of class (K1), the at least one further ethylenically unsaturated monomer is preferably selected from alkenyl carboxylates, (meth)acrylic esters and further olefins.

When further olefins are also copolymerized, they are preferably higher in molecular weight than the abovementioned $C_2$- to $C_{40}$-olefin base monomer. When, for example, the olefin base monomer used is ethylene or propene, suitable further olefins are in particular $C_{10}$- to $C_{40}$-α-olefins. Further olefins are in most cases only additionally copolymerized when monomers with carboxylic ester functions are also used.

Suitable (meth)acrylic esters are, for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof.

Suitable alkenyl carboxylates are, for example, $C_2$- to $C_{14}$-alkenyl esters, for example the vinyl and propenyl esters, of carboxylic acids having 2 to 21 carbon atoms, whose hydrocarbon radical may be linear or branched. Among these, preference is given to the vinyl esters. Among the carboxylic acids with a branched hydrocarbon radical, preference is given to those whose branch is in the α-position to the carboxyl group, the α carbon atom more preferably being tertiary, i.e. the carboxylic acid being a so-called neocarboxylic acid. However, the hydrocarbon radical of the carboxylic acid is preferably linear.

Examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers of group (K1) resulting therefrom are ethylene-vinyl acetate copolymers ("EVAs"), which are some of the most frequently used. Ethylene-vinyl acetate copolymers usable particularly advantageously and their preparation are described in WO 99/29748.

Suitable copolymers of class (K1) are also those which comprise two or more different alkenyl carboxylates in copolymerized form, which differ in the alkenyl function and/or in the carboxylic acid group. Likewise suitable are copolymers which, as well as the alkenyl carboxylate(s), comprise at least one olefin and/or at least one (meth)acrylic ester in copolymerized form.

Terpolymers of a $C_2$- to $C_{40}$-α-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized into the copolymers of class (K1) in an amount of preferably 1 to 50% by weight, especially 10 to 45% by weight and in particular 20 to 40% by weight, based on the overall copolymer. The main proportion in terms of weight of the monomer units in the copolymers of class (K1) therefore originates generally from the $C_2$ to $C_{40}$ base olefins.

The copolymers of class (K1) preferably have a number-average molecular weight $M_n$ of 1000 to 20 000, more preferably 1000 to 10 000 and in particular 1000 to 8000.

Typical comb polymers of component (K2) are, for example, obtainable by the copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (K2) are, for example, also those described in WO 2004/035715 and in "Comb-Like Polymers. Structure and Properties", N. A. Platé and V. P. Shibaev, J. Poly. Sci. Macromolecular Revs. 8, pages 117 to 253 (1974)". Mixtures of comb polymers are also suitable.

Polyoxyalkylenes suitable as components of class (K3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number-average molecular weight of up to 5000. Such polyoxyalkylene compounds are described, for example, in EP-A 061 895 and also in U.S. Pat. No. 4,491,455. Preferred polyoxyalkylene compounds are based on polyethylene glycols and polypropylene glycols having a number-average molecular weight of 100 to 5000. Additionally suitable are polyoxyalkylene mono- and diesters of fatty acids having 10 to 30 carbon atoms, such as stearic acid or behenic acid.

Polar nitrogen compounds suitable as components of class (K4) may be either ionic or nonionic and preferably have at least one substituent, in particular at least two substituents, in the form of a tertiary nitrogen atom of the general formula >$NR^7$ in which $R^7$ is a $C_8$- to $C_{40}$-hydrocarbon radical. The nitrogen substituents may also be quaternized, i.e. be in cationic form. An example of such nitrogen compounds is that of ammonium salts and/or amides which are obtainable by the reaction of at least one amine substituted by at least one hydrocarbon radical with a carboxylic acid having 1 to 4 carboxyl groups or with a suitable derivative thereof. The amines preferably comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs. Secondary amines suitable for this purpose are, for example, dioctadecylamine and methylbehenylamine. Also suitable for this purpose are amine mixtures, in particular amine mixtures obtainable on the industrial scale, such as fatty amines or hydrogenated tallamines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid, and succinic acids substituted by long-chain hydrocarbon radicals.

In particular, the component of class (K4) is an oil-soluble reaction product of poly($C_2$- to $C_{20}$-carboxylic acids) having at least one tertiary amino group with primary or secondary amines. The poly($C_2$- to $C_{20}$-carboxylic acids) which have at least one tertiary amino group and form the basis of this reaction product comprise preferably at least 3 carboxyl groups, especially 3 to 12 and in particular 3 to 5 carboxyl groups. The carboxylic acid units in the polycarboxylic acids have preferably 2 to 10 carbon atoms, and are especially acetic acid units. The carboxylic acid units are suitably bonded to the polycarboxylic acids, usually via one or more carbon and/or nitrogen atoms. They are preferably attached to tertiary nitrogen atoms which, in the case of a plurality of nitrogen atoms, are bonded via hydrocarbon chains.

The component of class (K4) is preferably an oil-soluble reaction product based on poly($C_2$- to $C_{20}$-carboxylic acids) which have at least one tertiary amino group and are of the general formula IIa or IIb

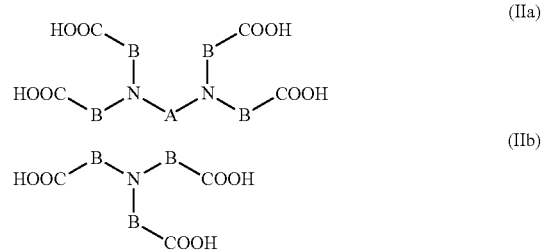

in which the variable A is a straight-chain or branched $C_2$- to $C_6$-alkylene group or the moiety of the formula III

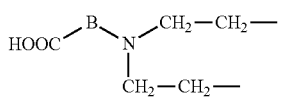

and the variable B is a $C_1$- to $C_{19}$-alkylene group. The compounds of the general formulae IIa and IIb especially have the properties of a WASA.

Moreover, the preferred oil-soluble reaction product of component (K4), especially that of the general formula IIa or IIb, is an amide, an amide-ammonium salt or an ammonium salt in which no, one or more carboxylic acid groups have been converted to amide groups.

Straight-chain or branched $C_2$- to $C_6$-alkylene groups of the variable A are, for example, 1,1-ethylene, 1,2-propylene, 1,3-propylene, 1,2-butylene, 1,3-butylene, 1,4-butylene, 2-methyl-1,3-propylene, 1,5-pentylene, 2-methyl-1,4-butylene, 2,2-dimethyl-1,3-propylene, 1,6-hexylene (hexamethylene) and in particular 1,2-ethylene. The variable A comprises preferably 2 to 4 and especially 2 or 3 carbon atoms.

$C_1$- to $C_{19}$-alkylene groups of the variable B are, for example, 1,2-ethylene, 1,3-propylene, 1,4-butylene, hexamethylene, octamethylene, decamethylene, dodecamethylene, tetradecamethylene, hexadecamethylene, octadecamethylene, nonadecamethylene and especially methylene. The variable B comprises preferably 1 to 10 and especially 1 to 4 carbon atoms.

The primary and secondary amines as a reaction partner for the polycarboxylic acids to form component (K4) are typically monoamines, especially aliphatic monoamines. These primary and secondary amines may be selected from a multitude of amines which bear hydrocarbon radicals which may be bonded to one another if appropriate.

These parent amines of the oil-soluble reaction products of component (K4) are usually secondary amines and have the general formula $HN(R^8)_2$ in which the two variables $R^8$ are each independently straight-chain or branched $C_{10}$- to $C_{30}$-alkyl radicals, especially $C_{14}$- to $C_{24}$-alkyl radicals. These relatively long-chain alkyl radicals are preferably straight-chain or only slightly branched. In general, the secondary amines mentioned, with regard to their relatively long-chain alkyl radicals, derive from naturally occurring fatty acid and from derivatives thereof. The two $R^8$ radicals are preferably identical.

The secondary amines mentioned may be bonded to the polycarboxylic acids by means of amide structures or in the form of the ammonium salts; it is also possible for only a portion to be present as amide structures and another portion as ammonium salts. Preferably only few, if any, free acid groups are present. The oil-soluble reaction products of component (K4) are preferably present completely in the form of the amide structures.

Typical examples of such components (K4) are reaction products of nitrilotriacetic acid, of ethylenediaminetetraacetic acid or of propylene-1,2-diaminetetraacetic acid with in each case 0.5 to 1.5 mol per carboxyl group, especially 0.8 to 1.2 mol per carboxyl group, of dioleylamine, dipalmitinamine, dicoconut fatty amine, distearylamine, dibehenylamine or especially ditallow fatty amine. A particularly preferred component (K4) is the reaction product of 1 mol of ethylenediaminetetraacetic acid and 4 mol of hydrogenated ditallow fatty amine.

Further typical examples of component (K4) include the N,N-dialkylammonium salts of 2-N',N'-dialkylamidobenzoates, for example the reaction product of 1 mol of phthalic anhydride and 2 mol of ditallow fatty amine, the latter being hydrogenated or unhydrogenated, and the reaction product of 1 mol of an alkenylspirobislactone with 2 mol of a dialkylamine, for example ditallow fatty amine and/or tallow fatty amine, the last two being hydrogenated or unhydrogenated.

Further typical structure types for the component of class (K4) are cyclic compounds with tertiary amino groups or condensates of long-chain primary or secondary amines with carboxylic acid-containing polymers, as described in WO 93/18115.

Sulfocarboxylic acids, sulfonic acids or derivatives thereof which are suitable as cold flow improvers of the component of class (K5) are, for example, the oil-soluble carboxamides and carboxylic esters of ortho-sulfobenzoic acid, in which the sulfonic acid function is present as a sulfonate with alkyl-substituted ammonium cations, as described in EP-A 261 957.

Poly(meth)acrylic esters suitable as cold flow improvers of the component of class (K6) are either homo- or copolymers of acrylic and methacrylic esters. Preference is given to copolymers of at least two different (meth)acrylic esters which differ with regard to the esterified alcohol. If appropriate, the copolymer comprises another different olefinically unsaturated monomer in copolymerized form. The weight-average molecular weight of the polymer is preferably 50 000 to 500 000. A particularly preferred polymer is a copolymer of methacrylic acid and methacrylic esters of saturated $C_{14}$ and $C_{15}$ alcohols, the acid groups having been neutralized with hydrogenated tallamine. Suitable poly(meth)acrylic esters are described, for example, in WO 00/44857.

The cold flow improver or the mixture of different cold flow improvers is added to the middle distillate fuel or diesel fuel in a total amount of preferably 10 to 5000 ppm by weight, more preferably of 20 to 2000 ppm by weight, even more preferably of 50 to 1000 ppm by weight and especially of 100 to 700 ppm by weight, for example of 200 to 500 ppm by weight.

Suitable lubricity improvers or friction modifiers are based typically on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers.

Suitable corrosion inhibitors are, for example, succinic esters, in particular with polyols, fatty acid derivatives, for example oleic esters, oligomerized fatty acids, substituted ethanolamines, and products sold under the trade name RC 4801 (Rhein Chemie Mannheim, Germany) or HiTEC 536 (Ethyl Corporation).

Suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes.

Suitable dehazers are, for example, alkoxylated phenol-formaldehyde condensates, for example the products available under the trade names NALCO 7D07 (Nalco) and TOLAD 2683 (Petrolite).

Suitable antifoams are, for example, polyether-modified polysiloxanes, for example the products available under the trade names TEGOPREN 5851 (Goldschmidt), Q 25907 (Dow Corning) and RHODOSIL (Rhone Poulenc).

Suitable cetane number improvers are, for example, aliphatic nitrates such as 2-ethylhexyl nitrate and cyclohexyl nitrate and peroxides such as di-tert-butyl peroxide.

Suitable antioxidants are, for example, substituted phenols, such as 2,6-di-tert-butylphenol and 6-di-tert-butyl-3-methylphenol, and also phenylenediamines such as N,N'-di-sec-butyl-p-phenylenediamine.

Suitable metal deactivators are, for example, salicylic acid derivatives such as N,N'-disalicylidene-1,2-propanediamine.

Suitable solvents are, for example, nonpolar organic solvents such as aromatic and aliphatic hydrocarbons, for example toluene, xylenes, white spirit and products sold under the trade names SHELLSOL (Royal Dutch/Shell Group) and EXXSOL (ExxonMobil), and also polar organic solvents, for example, alcohols such as 2-ethylhexanol, decanol and isotridecanol. Such solvents are usually added to the diesel fuel together with the aforementioned additives and coadditives, which they are intended to dissolve or dilute for better handling.

Middle distillate fuels such as diesel fuels or heating oils are preferably mineral oil raffinates which typically have a boiling range from 100 to 400° C. These are usually distillates having a 95% point up to 360° C. or even higher. These may also be so-called "ultra low sulfur diesel" or "city diesel", characterized by a 95% point of, for example, not more than 345° C. and a sulfur content of not more than 0.005% by weight or by a 95% point of, for example, 285° C. and a sulfur content of not more than 0.001% by weight. In addition to the mineral middle distillate fuels or diesel fuels obtainable by refining, those obtainable by coal gasification or gas liquefaction ["gas to liquid" (GTL) fuels] or by biomass liquefaction ["biomass to liquid" (BTL) fuels] are also suitable. Also suitable are mixtures of the aforementioned middle distillate fuels or diesel fuels with renewable fuels, such as biodiesel or bioethanol.

The qualities of the heating oils and diesel fuels are laid down in detail, for example, in DIN 51603 and EN 590 (cf. also Ullmann's Encyclopedia of Industrial Chemistry, 5th edition, Volume A12, p. 617 ff.).

In addition to the use thereof in the abovementioned middle distillate fuels of fossil, vegetable or animal origin, which are essentially hydrocarbon mixtures, the inventive quaternized terpolymer can also be used in mixtures of such middle distillates with biofuel oils (biodiesel). Such mixtures are also encompassed by the term "middle distillate fuel" in the context of the present invention. They are commercially available and usually comprise the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$-$C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or components thereof, are, for example, sunflower methyl ester, palm oil methyl ester ("PME"), soya oil methyl ester ("SME") and especially rapeseed oil methyl ester ("RME").

The middle distillate fuels or diesel fuels are more preferably those having a low sulfur content, i.e. having a sulfur content of less than 0.05% by weight, preferably of less than 0.02% by weight, more particularly of less than 0.005% by weight and especially of less than 0.001% by weight of sulfur.

Useful gasoline fuels include all commercial gasoline fuel compositions. One typical representative which shall be mentioned here is the Eurosuper base fuel to EN 228, which is customary on the market. In addition, gasoline fuel compositions of the specification according to WO 00/47698 are also possible fields of use for the present invention.

The inventive quaternized terpolymer is especially suitable as a fuel additive in fuel compositions, especially in diesel fuels, for overcoming the problems outlined at the outset in direct-injection diesel engines, in particular in those with common-rail injection systems.

The present invention thus also provides for the use of the inventive quaternized terpolymer as a fuel additive for reducing or preventing deposits in the injection systems, especially in the injectors, of direct-injection diesel engines, especially in common-rail injection systems.

In addition, the present invention therefore also provides for the use of the inventive quaternized terpolymer as a fuel additive for reducing the fuel consumption of direct-injection diesel engines, especially of diesel engines with common-rail injection systems.

In addition, the present invention therefore also provides for the use of the inventive quaternized terpolymer as a fuel additive for minimizing power loss in direct-injection diesel engines, especially in diesel engines with common-rail injection systems.

The examples which follow are intended to illustrate the invention without restricting it.

PREPARATION EXAMPLES

Examples 1a-1d

Preparation of ethylene-vinyl acetate-2-(dimethylamino)ethyl methacrylate terpolymers T1 to T4

By high-pressure polymerization at 200 to 220° C. and 1300 to 2000 bar of appropriate amounts of the monomers mentioned in each case, the ethylene-vinyl acetate ("VAc")-2-(dimethylamino)ethyl methacrylate ("DMAEMA") terpolymers T1 to T4, which serve as precursors for the inventive quaternized terpolymer and had the compositions [in mol %] and molecular weights $M_n$ reported below, were obtained:

|    | Ethylene | VAc  | DMAEMA | $M_n$ [g/mol] |
| --- | --- | --- | --- | --- |
| T1 | 86.4 | 10.2 | 3.4  | 2500 |
| T2 | 87.1 | 9.8  | 3.1  | 2500 |
| T3 | 85.4 | 4.0  | 10.6 | 2700 |
| T4 | 85.2 | 3.7  | 11.1 | 2700 |

Example 2a

Quaternization of the quaternized terpolymer T1 with styrene oxide

The terpolymer T1 from example 1a was reacted with styrene oxide in an equimolar ratio to the tertiary nitrogen atom in the DMAEMA in the presence of an equimolar amount of acetic acid, by initially charging the terpolymer and the styrene oxide under a nitrogen atmosphere and heating to 80° C., adding the acetic acid dropwise within 15 minutes and then stirring at 80° C. for 4 hours until the Preussmann test no longer detected any free epoxide. The quaternized terpolymer Tq1-1 was obtained in a yield of 95% in the form of a brown solid.

Example 2b

Quaternization of the Quaternized Terpolymer T1 with Styrene Oxide

The terpolymer T1 from example 1a was reacted with styrene oxide in a molar ratio of 1:1.2 to the tertiary nitrogen atom in the DMAEMA in the presence of a 2-fold molar excess of acetic acid, based on the amount of the tertiary nitrogen atom, by stirring the terpolymer, the styrene oxide and the acetic acid in the toluene solvent under a nitrogen atmosphere at 25° C. for 42 hours until the Preussmann test no longer detected any free epoxide. The quaternized terpolymer Tq1-2 was obtained in a yield of 96% in the form of a brown toluene solution.

USE EXAMPLES

Example 3

Measurement of Power Losses in a Direct-Injection Diesel Engine

To study the influence of the inventive quaternized terpolymer on the performance of direct-injection diesel engines, the power loss was determined on the basis of the official test method CEC F-98-08. The power loss is a direct measure of formation of deposits in the injectors. A standard direct-injection diesel engine with a common-rail system was used.

The fuel used was a commercial diesel fuel from Haltermann (RF-06-03). For artificial inducement of the formation of deposits at the injectors, 1 ppm by weight of zinc in the form of a zinc didodecanoate solution was added thereto.

The table below shows the results of the determinations of the relative power loss at 4000 rpm after 12 hours of uninterrupted operation. The value PL 0 reports the power loss compared to the performance value after 10 minutes, and the value PL 1 the power loss compared to the power value after 1 hour:

| Test run No. | Fuel additive | Dosage [ppm by weight of active substance] | PL 0 | PL 1 |
|---|---|---|---|---|
| Blank | none | — | 4.65% | 2.73% |
| 1 | Tq1-1 | 150 | 1.83% | 0.52% |
| 2 | Tq1-2 | 150 | 1.92% | 0.00% |
| 3 | T1 for comparison | 150 | 4.32% | 2.82% |

The invention claimed is:

1. A fuel comprising 10 to 5000 ppm by weight of a quaternized terpolymer formed from
  (A) 70 to 98.9 mol % of ethylene,
  (B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and
  (Cq) 0.1 to 15 mol % of at least one ethylenically unsaturated monomer which comprises at least one tertiary nitrogen atom which is partly or fully in quaternized form,
    where all monomer components together add up to 100 mol %; and
    at least one fuel selected from the group consisting of a gasoline fuel, a middle distillate fuel and a diesel fuel.

2. The fuel according to claim 1 wherein said quaternized terpolymer is obtainable from a terpolymer formed from
  (A) 70 to 98.9 mol % of ethylene,
  (B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and
  (C) 0.1 to 15 mol % of at least one ethylenically unsaturated monomer which comprises at least one quaternizable tertiary nitrogen atom which,
    where all monomer components together add up to 100 mol %,
    by partial or full quaternization, which follows the polymerization of components (A), (B) and (C), of the at least one tertiary nitrogen atom in component (C) with at least one quaternizing agent.

3. The fuel according to claim 1 wherein said quaternized terpolymer is formed from
  (A) 76 to 96 mol % of ethylene,
  (B) 3 to 12 mol % of component (B) and
  (Cq) 1 to 12 mol % of component (Cq).

4. The fuel according to claim 1 wherein said quaternized terpolymer comprises, as component (B), vinyl acetate.

5. The fuel according to claim 1 wherein said quaternized terpolymer comprises, as component (Cq), at least one partly or fully quaternized ethylenically unsaturated monomer from the group of 2-(N,N-dialkylamino)ethyl acrylates, 2-(N,N-dialkylamino)ethyl methacrylates, N-[3-(N',N'-dialkylamino)propyl]acrylamides, N-[3-(N',N'-dialkylamino)propyl]methacrylamides, N-alkyl-N'-vinylpiperazines, N-vinylimidazole, vinylpyridines and the esters of acrylic acid or of methacrylic acid with N-(β-hydroxyethyl)imidazole, N-alkyl-N'-(β-hydroxyethyl)piperazines, (β-hydroxyethyl)-pyridines and hydroxypyridines.

6. The fuel according to claim 1 wherein quaternization is effected with at least one quaternizing agent selected from epoxides, dialkyl sulfates, dialkyl sulfites, alkyl halides, arylalkyl halides, alkyl carboxylates and dialkyl carbonates.

7. The fuel according to claim 1 wherein said quaternized terpolymer has a number-average molecular weight in the range from 1000 to 20000.

8. The fuel according to claim 1, wherein said fuel is a gasoline fuel.

9. The fuel according to claim 1, wherein said fuel is a middle distillate fuel.

10. The fuel according to claim 1, wherein said fuel is a diesel fuel.

11. The fuel according to claim 1, wherein said quaternized terpolymer is partially quaternized.

12. The fuel according to claim 1, wherein said quaternized terpolymer is fully quaternized.

13. A method for reducing or preventing deposits in the injection systems of direct-injection diesel engines comprising combusting a fuel comprising 10 to 5000 ppm by weight of a quaternized terpolymer formed from (A) 70 to 98.9 mol % of ethylene, (B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and (Cq) 0.1 to 15 mol % of at least one ethylenically unsaturated monomer which comprises at least one tertiary nitrogen atom which is partly or fully in quaternized form, where all monomer components together add up to 100 mol % in a direct-injection diesel engine.

14. The method for reducing or preventing deposits in the injection systems of direct-injection diesel engines according to claim 13, wherein said diesel engine comprises a common-rail injection system.

15. A method for reducing the fuel consumption of direct-injection diesel engines comprising combusting a fuel comprising 10 to 5000 ppm by weight of a quaternized terpolymer formed from (A) 70 to 98.9 mol % of ethylene, (B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and (Cq) 0.1 to 15 mol % of at least one ethylenically unsaturated monomer which comprises at least one tertiary nitrogen atom which is partly or fully in quaternized form, where all monomer components together add up to 100 mol % in a direct-injection diesel engine.

16. The method for reducing fuel consumption of direct-injection diesel engines according to claim 15, wherein said diesel engine comprises a common-rail injection system.

17. A method for minimizing power loss in direct-injection diesel engines comprising combusting a fuel comprising 10 to 5000 ppm by weight of a quaternized terpolymer formed from (A) 70 to 98.9 mol % of ethylene, (B) 1 to 15 mol % of (i) a $C_2$-$C_{14}$-alkenyl ester of one or more aliphatic $C_1$-$C_{20}$-monocarboxylic acids or of (ii) one or more $C_1$-$C_{24}$-alkyl esters of acrylic acid or of methacrylic acid and (Cq) 0.1 to 15 mol % of at least one ethylenically unsaturated monomer which comprises at least one tertiary nitrogen atom which is partly or fully in quaternized form, where all monomer components together add up to 100 mol % in a direct-injection diesel engine.

18. The method for minimizing power loss in direct-injection diesel engines according to claim 17, wherein said diesel engine comprises a common-rail injection system.

* * * * *